(12) United States Patent
Clarke et al.

(10) Patent No.: US 6,232,013 B1
(45) Date of Patent: *May 15, 2001

(54) DROPPABLE BATTERY PACKS

(75) Inventors: John Edward Clarke, Colts Neck; Suresh Goyal, Warren; Sanjay Sudhaker Upasani, Manalapan, all of NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,055

(22) Filed: Nov. 26, 1997

(51) Int. Cl.$^7$ ............................... H01M 2/10; H01M 6/00
(52) U.S. Cl. ............................... 429/100; 429/96; 429/99; 29/623.1; 29/623.4
(58) Field of Search .......................... 429/96–100, 121; 29/623.1, 623.4

(56) References Cited

U.S. PATENT DOCUMENTS

| | | | | |
|---|---|---|---|---|
| 1,439,429 | * | 12/1922 | Lyhne | 429/100 |
| 4,091,187 | * | 5/1978 | Kaye | 429/159 |
| 5,225,294 | * | 7/1993 | Schifrin | 429/99 |
| 5,308,717 | * | 5/1994 | Gordin | 429/99 |
| 5,466,545 | * | 11/1995 | Chamberlain et al. | 429/99 |
| 5,508,123 | | 4/1996 | Fat | 429/96 |
| 5,643,693 | * | 7/1997 | Hill et al. | 429/121 |
| 5,770,328 | * | 6/1998 | Friedli et al. | 429/96 |
| 5,824,431 | * | 10/1998 | Tsurumaru et al. | 429/97 |

OTHER PUBLICATIONS

Abstract of Japan JP 08 022812 A (Matsushita Electric Ind. Co. LTD), Jan. 31, 1996 (Jan. 23, 1996).

European Patent Office Search Report, Application No. EP 98309617, The Hague, Jan. 13, 2000.

* cited by examiner

*Primary Examiner*—Carol Chaney
*Assistant Examiner*—Tracy Dove
(74) *Attorney, Agent, or Firm*—Eugene J. Rosenthal

(57) ABSTRACT

In a battery pack made up of battery cells encased within a housing made up of a stronger outer housing portion and a weaker inner housing portion, the battery cells are secured to the stronger outer housing portion. Advantageously, the relative motion between the battery cells and the stronger of the housing portions that results when prior art battery packs are dropped, and which causes catastrophic failure of the prior art battery packs, is prevented. The battery cells may be secured to the stronger outer housing portion, for example, by gluing the battery cells to the stronger housing portion, attaching the battery cells to the stronger housing portion by using double-sided sticky tape, molding features into the stronger housing portion that immobilize the battery cells adjacent to the stronger housing portion, or providing screw holes through the stronger housing portion so that screws may engage the battery cell or an appendage thereto.

58 Claims, 4 Drawing Sheets

DROPPABLE BATTERY PACKS

TECHNICAL FIELD

This invention relates to the providing of battery packs such as are used by portable devices, and more particularly, for providing of battery packs that are better able to withstand the impact of being dropped.

BACKGROUND OF THE INVENTION

A portable device, such as a cellular telephone or a laptop computer, often is used with an external battery pack. In particular, such a battery pack includes one or more battery cells which are housed in a housing that is separate from the housing of the rest of the portable device. The use of a battery pack that has battery cells housed separately from the portable device facilitates the charging of the battery cells without tying up the portable device in the process, and it permits easy replacement of a battery pack, e.g., a discharged one, with another battery pack, e.g., a charged one.

A well known problem in the art of portable devices is that when a portable device is dropped its housing tends to fail. Typically the housing shatters, becomes deformed, or comes apart at its joints. So too, the housing of a battery pack which is for use with the portable device. Indeed, failure of the battery pack housing may occur when the battery pack alone is dropped or when the combination of a battery pack attached to a portable device is dropped. In addition, when the battery pack is attached to the portable device and the combination is dropped, there is a tendency for the battery pack to separate from the portable device.

The housing of a battery pack is often fashioned from two housing portions, one of which is usually mechanically weaker than the other. The two housing portions are joined at a joint which may or may not be as strong as the weaker housing portion of the battery pack housing. Such an architecture is employed for the battery pack because the battery pack is often a substantial portion of the overall portable device when coupled thereto. Therefore, to avoid the appearance of extra seams, one housing portion, typically the stronger one, forms all the visible housing of the battery pack. The other housing portion is typically smaller, weaker, and hidden, e.g., by being a recessed plate attached to the stronger housing portion. To reduce the weight of the battery pack, and thus the weight of the overall portable device, the smaller, weaker, hidden housing portion of the battery pack is often formed with holes through its surface, which tends to further weaken it.

When such a battery pack is dropped, typically, there is a sequence of multiple impacts. For example, the battery pack itself may strike the ground, possibly several times, and the battery cells themselves may strike the battery pack housing portions as well as each other, also possibly several times. The various strikes of the battery pack itself with the ground are collectively referred to as "clattering" while the various strikes of the battery cells within the housing are collectively termed "rattling". The net result of the clattering and rattling is that the battery cells can have an impact with the weaker housing portion at a velocity that is substantially higher than the velocity of the battery pack when it first strikes the ground. As a result, either the weaker housing portion can shatter or the stronger and weaker housing portions can become separated at the joint between them. Either of these results is typically a catastrophic failure that renders the battery pack unusable.

SUMMARY OF THE INVENTION

We have recognized that by substantially preventing relative motion between the battery cells and the stronger of the battery pack housing portions that the catastrophic failure of prior art battery packs when dropped can be reduced or avoided. The relative motion between the battery cells and the stronger of the housing portions is substantially prevented by adhering the battery cells to the stronger housing portion, for example, by gluing the battery cells to the stronger housing portion, attaching the battery cells to the stronger housing portion by using double-sided sticky tape, single-sided sticky tape, molding features into the stronger housing portion that immobilize the battery cells adjacent to the stronger housing portion, providing screw holes through the stronger housing portion so that screws may engage the battery cell or an appendage thereto, or VELCRO™. Moreover, in the event that the housing portions of a battery pack are equally strong, the battery cells may be attached to either one of the housing portions.

DETAILED DESCRIPTION

Figure 1:
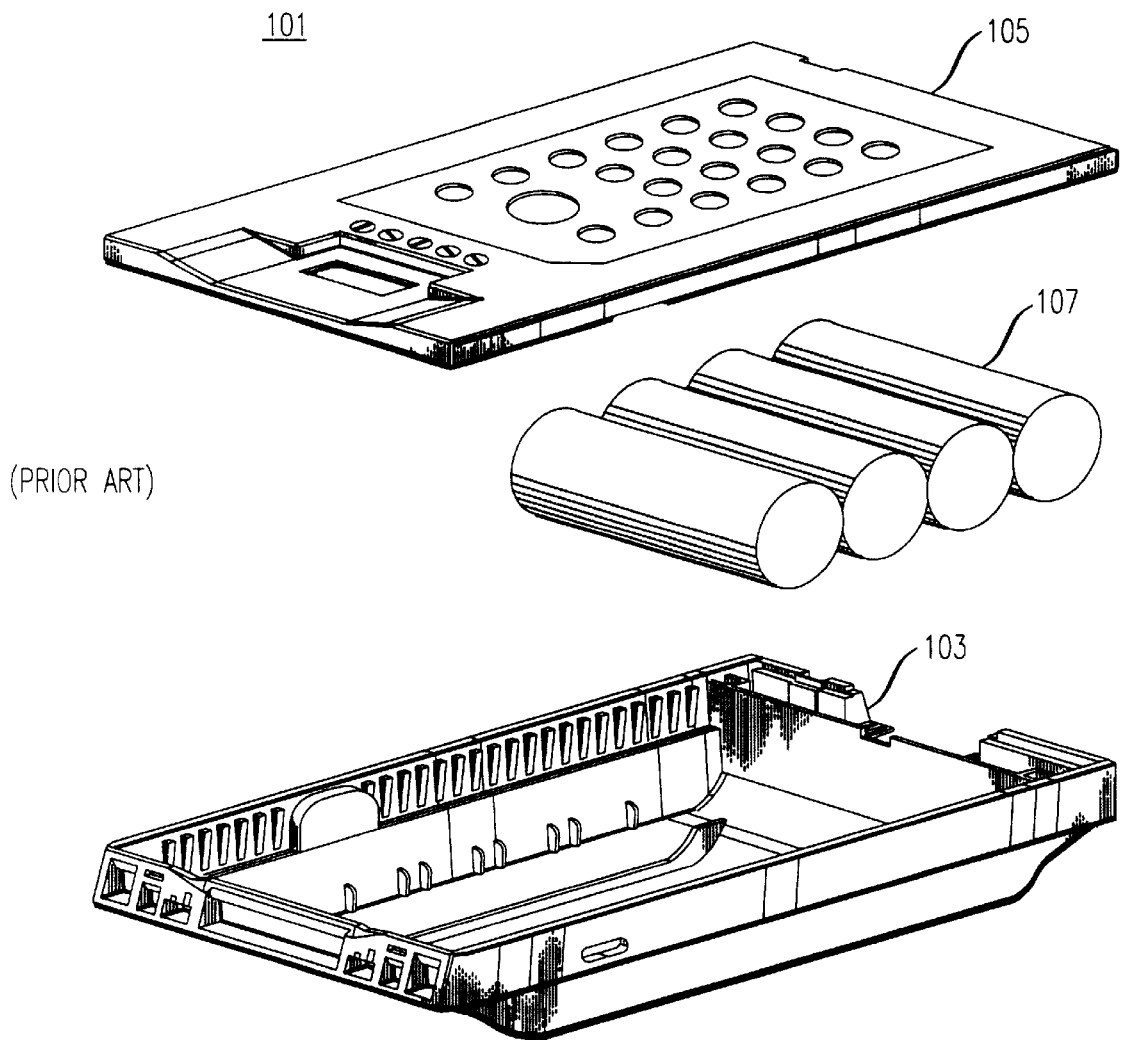
FIG. 1 shows an exploded view of an exemplary prior art battery pack.

FIG. 1 shows an exploded view of an exemplary prior art battery pack 101. FIG. 1 is intended only to convey the overall mechanical structure of battery pack 101 without regard for the electrical connections therein. Battery pack 101 includes stronger outer housing portion 103, weaker inner housing portion 105, and battery cells 107. Battery cells 107 are merely placed within stronger outer housing portion 103, and weaker inner housing portion 105 is ultrasonically welded to stronger outer housing portion 103. From the following description, it will be clear to one of ordinary skill in the art how to modify battery pack 101 to conform to the principles of the invention.

FIGS. 2–11 show various embodiments of battery packs which have been designed in accordance with the principles of the invention so that relative motion between the battery cells and the stronger of the housing portions is prevented by adhering the battery cells to the stronger housing portion. Typically, because the battery pack is such a large part of a portable device, the inner housing portion, which is the one facing the other portion of the portable device, is the weaker housing portion while the outer housing portion, with the greater visible surface area, is the stronger housing portion.

Figure 2:
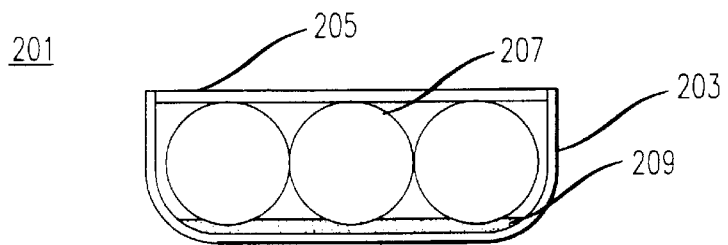
FIGS. 2–11 show various embodiments of battery packs which have been designed in accordance with the principles of the invention.

FIG. 2 shows a cross-sectional view of battery pack 201, which includes stronger outer housing portion 203, weaker inner housing portion 205, and battery cells 207. In this embodiment of the invention, a layer of glue 209 is employed to secure battery cells 207 to stronger outer housing portion 203. The type of glue employed preferably has the characteristics that it: a) provides reasonably rigid coupling between the battery and outer housing portion 203; b) does not attack, i.e., corrode or dissolve the battery or the housing materials; and c) is effective over the entire storage and operating temperature range of the battery pack. For example, for nickel-metal-hydride ($NiMH_x$) battery cells encased in their own housing made of an outer layer of nickel-plated steel around which was heat shrunk a tube of poly vinyl-chloride (PVC) of 0.1 millimeter thickness prior to shrinking used with a stronger outer housing portion made of General Electric SP6400R polycarbonate, a glue for which good results have been obtained is Adhesive Compounds part number (p/no.) #1702, a hot melt adhesive. Note that by glue it is meant any form of chemical adhesive substance.

Figure 3:
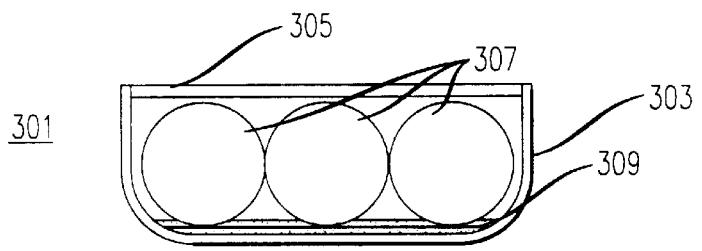

FIG. 3 shows a cross-sectional view of battery pack 301, which is similar in structure to battery pack 201 and includes stronger outer housing portion 303, weaker inner housing portion 305, and battery cells 307. In this embodiment of the invention, a layer of double-sided sticky tape 309 is employed to secure battery cells 307 to stronger outer housing portion 303. The type of sticky tape employed preferably has the characteristics that it: a) provides reasonably rigid coupling between the battery and the stronger housing portion 303, although it is recognized that double-sided sticky tape will provide a less rigid coupling than glue; b) does not attack, i.e., corrode or dissolve the battery or the housing materials; and c) is effective over the entire storage and operating temperature range of the battery pack. In addition, double sticky tape has the advantage over glue that, during assembly of the battery pack there is more flexibility to move the battery cells within the battery pack to insure proper placement therein. Also, double-sided sticky tape is typically easier to employ on an assembly line, and it tends to result in less of a mess. For example, for nickel-metal-hydride ($NiMH_x$) battery cells encased in their own housing made of an outer layer of nickel-plated steel around which was heat shrunk a tube of poly vinyl-chloride (PVC) of 0.1 millimeter thickness prior to shrinking used with a stronger outer housing portion made of General Electric SP6400R polycarbonate, one exemplary double-sided sticky tape for which good results have been obtained is a tape foam made ENSOLITE™ neoprene coated on each side with the BEPHEM™ adhesive #2515D.

Figure 4:
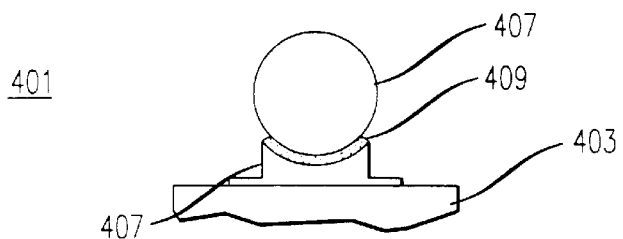

FIG. 4 shows another embodiment of the invention in which a battery cell 407 is secured to stronger outer housing portion 403 by adhesive layer 409, which may be either glue or double-sided sticky tape. In FIG. 4 stronger outer housing portion 403 has molded thereon receptacle 411 for battery cell 401, in accordance with an aspect of the invention. Advantageously, receptacle 411 provides a higher surface area for adhesive attachment between the curved surface of battery cell 407 and receptacle 411 than would otherwise obtainable had the curved surface of battery cell 407 been adhered to a flat section of stronger outer housing portion 403.

In other embodiments of the invention similar to that shown in FIG. 4, receptacle 411 need not be molded as in integral part of stronger outer housing portion 403. Instead, receptacle 411 may be molded separately and secured, e.g., via glue, double sided sticky tape, snap action, or screw action, to stronger outer housing portion 403. Also, it will be appreciated by those skilled in the art that receptacle 411 may be formed out of a material that is different from the material which makes up stronger outer housing portion 403.

For example, a receptacle may be made of metal while the stronger outer housing portion is made of plastic. More than one receptacle may be used for any particular battery cell.

Alternatively, adhesive need not be used, but instead the battery cell is press-fit to the receptacle, so that substantial relative motion between the battery cell and the receptacle, and consequently, the stronger outer housing portion, is substantially prevented.

Figure 5:
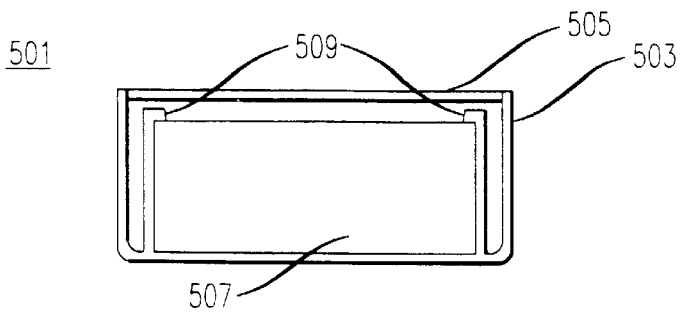
Figure 6:
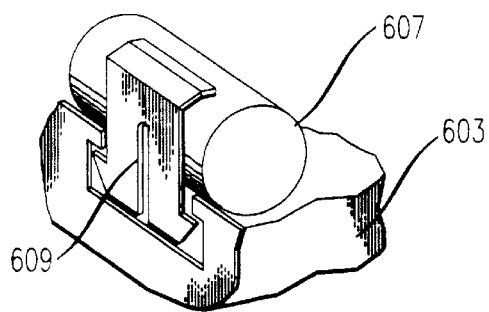
Figure 7:
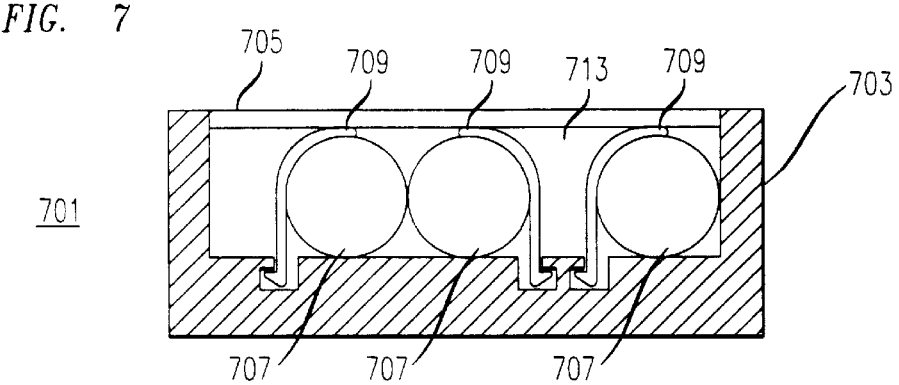

FIG. 5 shows another embodiment of the invention in which battery cell 507 is secured to stronger outer housing portion 503 by clips 509. As shown in FIG. 5, clips 509 are molded as projections from stronger outer housing portion 503. In alternative embodiments of the invention using at least one clip, the clip could be inserted and, optionally secured, e.g., glued snapped, or screwed, into a matching receptacle in the stronger outer housing portion after the battery cell is placed therein. FIGS. 6 and 7 show embodiments of the invention using at least one inserted clip. Note that, as shown in FIGS. 6 and 7, for example, only one clip may be required for each battery cell. Also note that, in FIG. 7, by staggering clips 709 along the axis of battery cells 707, gap 713 between oppositely facing ones of clips 709 may be eliminated. Other types of clips may be developed by those of ordinary skill in the art and employed in accordance with the principles of the invention. It will be appreciated by those skilled in the art that a clip may be formed out of a material that is different from the material which makes up the stronger outer housing portion. For example, a clip may be made of metal while the stronger outer housing portion is made of plastic.

Figure 8:
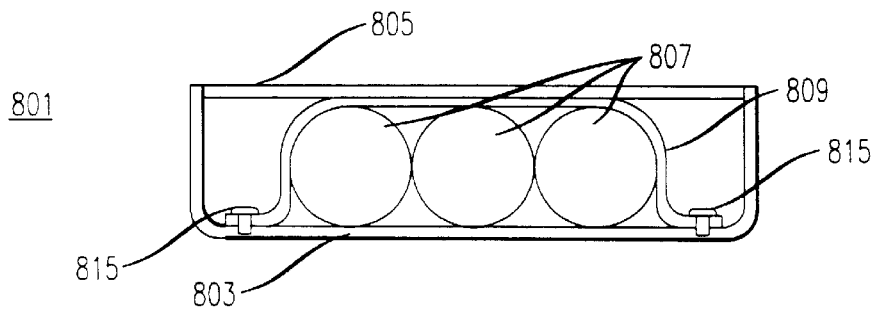

In the embodiment of the invention shown in FIG. 8, battery cells 807 are secured to stronger outer housing portion 803 by retainer 809. Retainer 809 is coupled to stronger outer housing portion 803 by one or more fasteners 815. Fasteners 815 may be screws, snap in pins or any other form of fastener. Indeed, retainer 809 may even be glued, or secured by double-sided sticky tape, to stronger outer housing portion 803. Weaker inner housing portion 805 is mounted above retainer 809. Retainer 809 may be formed out of a material that is different from the material which makes up stronger outer housing portion 803. For example, retainer 809 may be made of metal while stronger outer housing portion 803 is made of plastic. Furthermore, fasteners 815 may be formed out of a material that is different from the material which makes up stronger outer housing portion 803 and that which makes up retainer 809. More than one retainer may be employed within a single battery pack, or even for a single battery cell.

Figure 9:
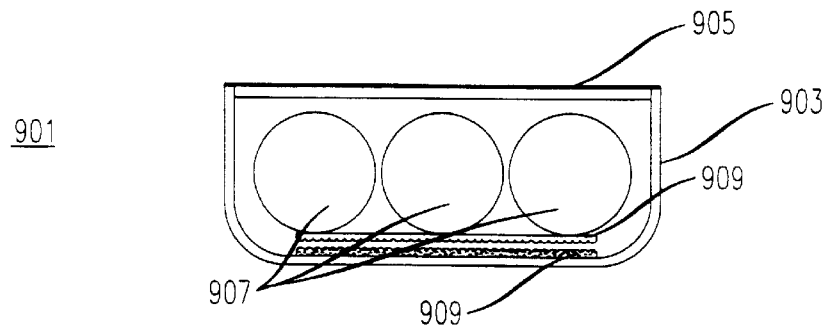
Figure 10:
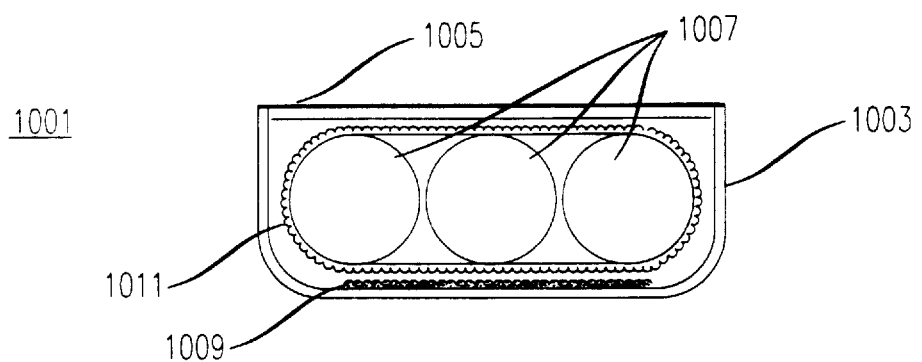

FIG. 9 shows an embodiment of the invention similar to that shown in FIG. 3 but in which the double-sided sticky tape has been replaced by matable VELCRO™ hook and loop tape strips 909, one of which is adhered to battery cells 907 and the other of which is adhered to stronger outer housing portion 903. It is immaterial which of VELCRO™ hook and loop tape strips 909 is the hook-type of Velcro and which is the loop-type of VELCRO™ hook and loop tape. Alternatively, as shown in FIG. 10, some, or all, of battery cells 1007 are encircled by one of VELCRO™ hook and loop tape strips 1009, which mates to the other of VELCRO™ hook and loop tape strips 1009, which is affixed to stronger outer housing portion 1003. In FIGS. 5–11 there are reference numerals indicating elements of the FIGS. that are not specifically in mentioned in this description. For such reference numerals the lowest two digits designate the particular elements while any higher order digits correspond to the number of the FIG. in which that element is located. The particular element designated corresponds in function to the element having the same lowest two digits and described in connection with FIGS. 1 or 2. For example, element 505 designates the weaker housing portion of the embodiment shown in FIG. 5, and similarly, 1107 designates the battery cells in FIG. 11.

Figure 11:
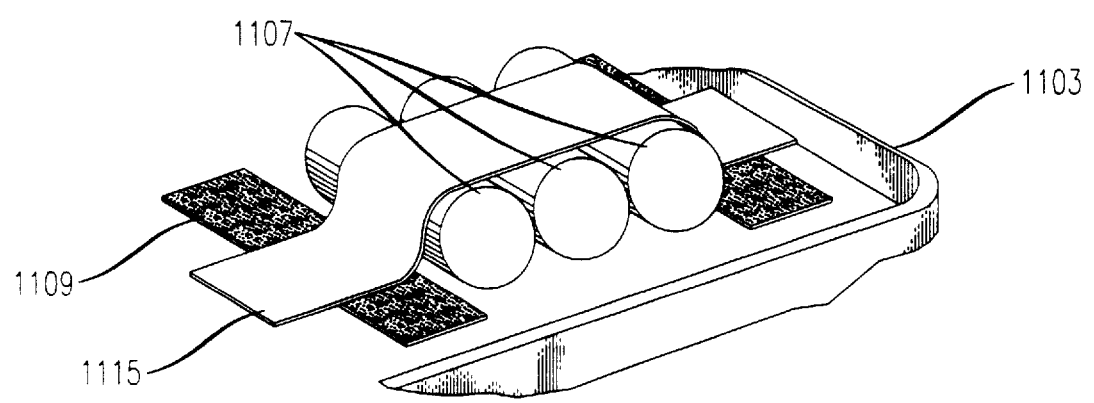

FIG. 11 shows yet another embodiment of the invention, which is similar to that of FIG. 8, except that a) retainer 809 is replaced by VELCRO™ hook and loop tape strap 1109 and b) fasteners 815 are replaced by VELCRO™ hook and loop tape strips 1115 affixed to stronger outer housing portion 1103. VELCRO™ hook and loop tape strips 1115 may be coupled to stronger outer housing portion 1103 by any technique, e.g., being self sticking, adhesive, clip-type fasteners, screws, etc. It is immaterial as to which of VELCRO™ hook and loop tape strap 1109 or Velcro strips 1115 is the hook-type of VELCRO™ hook and loop tape and which is the loop-type of Velcro. Also, instead of being two separate strips, VELCRO™ hook and loop tape strips 1115 may be merged into a single strap.

In accordance with another embodiment of the invention, single-sided sticky tape may be used, with the sticky side facing the battery cells. The tape may be secured to the stronger outer housing portion in any manner desired, e.g., by glue or pins pushed through the tape to snap into the stronger outer housing portion.

Note that terminology used herein based on the word screw, such as screwed or screw action, is intended to encompass embodiments of the invention in which separate screws, and/or nuts are employed, or where screw grooves are formed as an integral part of a component of a battery pack, e.g., a receptacle, a snap, or the stronger outer housing portion, and used in conjunction with screw grooves formed as an integral part of another component of the battery pack, and/or with a separate screw or nut.

In still another embodiment of the invention, a battery cell may itself be screwed directly to the stronger outer housing portion. With the above-described expansive definition of screwed in mind, this embodiment of the invention may be achieved by forming screw threads on the battery cell and matching threads on the stronger outer housing portion. The screw threads of the battery cell may be formed on an outer surface thereof, to mate to a threaded recess of the stronger outer housing portion. Alternatively, the battery cells may be formed with a threaded recess which is mated to a threaded projection from the stronger outer housing portion. The threaded projection may be a) integral to the stronger outer housing portion, b) coupled thereto, or c) passed therethrough.

In an alternative screw based embodiment of the invention, if two or more battery cells are held together, e.g., lashed together or wrapped in a tape-like plastic, prior to being inserted into the battery pack, a single screw may be sufficient for all the cells. In fact, a hole in the material holding the cells together mated to a screw projecting from the stronger outer housing portion may suffice. Alternately, the material holding the multiple battery cells together may be affixed to the stronger outer housing portion using any of the above-described techniques.

Note that, if desired, one may also secure the battery cells to the weaker housing portion in addition to securing them to the stronger outer housing portion. Also note that the securing of the battery cells to the stronger outer housing portion is intended to be performed in a manner that is at least a semi-permanent, if not an entirely permanent, i.e., for the life of the battery pack. This is because, typically, the battery cells are not changed, nor are they removed, during the life of the battery pack, unless there is a need to repair the battery pack. Instead, the battery pack is recharged when the battery cells become discharged. When the battery cells become unable to hold sufficient charge to power the portable device for a sufficient length of time, the battery pack is disposed of, or alternatively, recycled.

As used herein, the term battery pack may be limited to a battery pack of the type that is capable of existing as a separate unit independent of any portable device to which it may be coupled for supplying power thereto. Of course, some technique must be employed to couple the portable device to the battery pack, which remains external to the portable device.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A battery pack comprising at least one battery cell contained within a housing made up of at least a first housing portion and a second housing portion, said first and second housing portions being coupled at a joint, said battery pack being characterized in that said at least one battery cell is adhered only to the stronger of said first housing portion and said second housing portion and is independent of, and not coupled to, said weaker housing portion, whereby relative motion between said at least one battery cell and the stronger of said first housing portion and second housing portion in the direction of the weaker of said first housing portion and second housing portion is prevented.

2. The invention as defined in claim 1 wherein said at least one battery cell is adhered to the stronger of said first housing portion and said second housing portion using at least glue.

3. The invention as defined in claim 1 wherein said at least one battery cell is adhered to the stronger of said first housing portion and said second housing portion using at least double-sided sticky tape.

4. The invention as defined in claim 1 wherein said at least one battery cell is adhered to the stronger of said first housing portion and said second housing portion using at least hook and loop tape.

5. The invention as defined in claim 1 wherein said at least one battery cell is adhered to the stronger of said first housing portion and said second housing portion using at least one screw.

6. The invention as defined in claim 1 wherein said at least one battery cell is adhered to the stronger of said first housing portion and said second housing portion using at least one retainer.

7. The invention as defined in claim 1 wherein said at least one battery cell is adhered to the stronger of said first housing portion and said second housing portion using at least single-sided sticky tape.

8. The invention as defined in claim 1 wherein said at least one battery cell is adhered to the stronger of said first housing portion and said second housing portion using a receptacle having a surface formed to match a non-planar surface of said at least one battery cell that is secured to the stronger of said first housing portion and said second housing portion.

9. The invention as defined in claim 1 wherein said at least one battery cell is adhered to the stronger of said first housing portion and said second housing portion using at least one clip so that the resulting coupling between said at least one battery cell and the stronger of said first housing portion and said second housing portion is not mechanically resilient.

10. A battery pack comprising at least one battery cell contained within a housing made up of at least a first housing portion and a second housing portion, said first and second housing portions being coupled at a joint, said battery pack being characterized in that said at least one battery cell is adhered to the stronger of said first housing portion and said second housing portion, whereby relative motion between said at least one battery cell and the stronger of said first housing portion and second housing portion in the direction of the weaker of said first housing portion and second housing portion is prevented, wherein said at least one battery cell is adhered to the stronger of said first housing portion and said second housing portion using at least one clip so that the resulting coupling between said at least one battery cell and the stronger of said first housing portion and said second housing portion is not mechanically resilient, and wherein said clip is molded as part of the stronger of said first housing portion and said second housing portion.

11. The invention as defined in claim 9 wherein said clip is snapped into the stronger of said first housing portion and said second housing portion.

12. The invention as defined in claim 9 wherein said clip is screwed to the stronger of said first housing portion and said second housing portion.

13. A battery pack comprising at least one battery cell contained within a housing made up of at least a first housing portion and a second housing portion, said first and second housing portions being coupled at a joint, said battery pack being characterized in that said at least one battery cell is adhered to the stronger of said first housing portion and said second housing portion, whereby relative motion between said at least one battery cell and the stronger of said first housing portion and second housing portion in the direction of the weaker of said first housing portion and second housing portion is prevented;

wherein said at least one battery cell is adhered to the stronger of said first housing portion and said second housing portion using at least one clip so that the resulting coupling between said at least one battery cell and the stronger of said first housing portion and said second housing portion is not mechanically resilient, and wherein said clip is glued to the stronger of said first housing portion and said second housing portion.

14. A battery pack comprising:

a first housing portion;

a second housing portion coupled to said first housing portion;

at least one battery cell; and means for adhering said at least one battery cell to the stronger of said first housing portion and second housing portion, said at least one battery cell being independent of, and not coupled to, said weaker housing portion, whereby relative motion between said at least one battery cell and the stronger of said first housing portion and second housing portion in the direction of the weaker of said first housing portion and second housing portion is substantially prevented.

15. The invention as defined in claim 14 wherein said means for adhering comprises glue.

16. The invention as defined in claim 14 wherein said means for adhering comprises double-sided sticky tape.

17. The invention as defined in claim 14 wherein said means for adhering comprises single-sided sticky tape.

18. The invention as defined in claim 14 wherein said means for adhering comprises at least one clip that causes a not mechanically resilient coupling between said at least one battery cell and the stronger of said first housing portion and said second housing portion.

19. The invention as defined in claim 14 wherein said means for adhering comprises at least one screw.

20. The invention as defined in claim 14 wherein said means for adhering comprises at least one retainer.

21. The invention as defined in claim 14 wherein said means for adhering comprises hook and loop tape.

22. A battery pack comprising:

a first housing portion;

a second housing portion adapted to be coupled to said first housing portion; and at least one battery cell adhered to the stronger of said first housing portion and second housing portion to prevent relative motion between said battery cell and the stronger of said first housing portion and second housing portion in the direction of the weaker of said first housing portion and second housing portion, said battery cell being independent of, and not coupled to, said weaker housing portion.

23. The invention as defined in claim 22 wherein said at least one battery cell is adhered to the stronger of said first housing portion and second housing portion using at least glue.

24. The invention as defined in claim 22 wherein said at least one battery cell is adhered to the stronger of said first housing portion and second housing portion using at least double-sided sticky tape.

25. The invention as defined in claim 22 wherein said at least one battery cell is adhered to the stronger of said first housing portion and second housing portion using at least single-sided sticky tape.

26. The invention as defined in claim 22 wherein said at least one battery cell is adhered to the stronger of said first housing portion and second housing portion using at least one clip, causes a not mechanically resilient coupling between said at least one battery cell and the stronger of said first housing portion and said second housing portion.

27. The invention as defined in claim 22 wherein said at least one battery cell is adhered to the stronger of said first housing portion and second housing portion using at least one retainer.

28. The invention as defined in claim 22 wherein said at least one battery cell is adhered to the stronger of said first housing portion and second housing portion using at least hook and loop tape.

29. The invention as defined in claim 22 wherein said at least one battery cell is adhered to the stronger of said first housing portion and second housing portion using at least one screw.

30. A first housing portion and at least one battery cell for use in a battery pack, said first housing portion being adapted to mate with a second housing portion to form a housing of said battery pack, said first housing portion being stronger than said second housing portion, said first housing portion and at least one battery cell being characterized in that said at least one battery cell is adhered only to said first housing portion and said at least one battery cell being independent of, and not coupled to, said second housing portion, whereby relative motion between said at least one battery cell and said first housing portion in the direction of said second housing portion is substantially prevented.

31. The invention as defined in claim 30 wherein said at least one battery cell is adhered to said first housing portion by glue.

32. The invention as defined in claim 30 wherein said at least one battery cell is adhered to said first housing portion by double-sided sticky tape.

33. The invention as defined in claim 30 wherein said at least one battery cell is adhered to said first housing portion by single-sided sticky tape.

34. The invention as defined in claim 30 wherein said at least one battery cell is adhered to said first housing portion by at least one clip, so as to result in a not mechanically resilient coupling between said at least one battery cell and the stronger of said first housing portion and said second housing portion.

35. The invention as defined in claim 30 wherein said at least one battery cell is adhered to said first housing portion by at least one screw.

36. The invention as defined in claim 30 wherein said at least one battery cell is adhered to said first housing portion by at least one retainer.

37. The invention as defined in claim 30 wherein said at least one battery cell is adhered to said first housing portion by hook and loop tape.

38. A method for manufacturing a battery pack which includes a first housing portion, a second housing portion adapted to be coupled to said first housing portion, and at least one battery cell, the method comprising the step of:

adhering said at least one battery cell only to the stronger of said first housing portion and second housing portion, said at least one battery cell being independent of, and not coupled to, said second housing portion, whereby relative motion between said at least one battery cell and the stronger of said first housing portion and second housing portion in the direction of the weaker of said first housing portion and second housing portion is substantially prevented.

39. The invention as defined in claim 38 wherein in said adhering step said at least one battery cell is secured to the stronger of said first housing portion and second housing portion by way of at least glue.

40. The invention as defined in claim 38 wherein in said adhering step said at least one battery cell is secured to the stronger of said first housing portion and second housing portion by way of at least double-sided sticky tape.

41. The invention as defined in claim 38 wherein in said adhering step said at least one battery cell is secured to the stronger of said first housing portion and second housing portion by way of at least single-sided sticky tape.

42. The invention as defined in claim 38 wherein in said adhering step said at least one battery cell is secured to the stronger of said first housing portion and second housing portion by way of at least one clip so that said at least one battery cell and the stronger of said first housing portion and said second housing portion are not mechanically resiliently coupled.

43. The invention as defined in claim 38 wherein in said adhering step said at least one battery cell is secured to the stronger of said first housing portion and second housing portion by way of at least one screw.

44. The invention as defined in claim 38 wherein in said adhering step said at least one battery cell is secured to the stronger of said first housing portion and second housing portion by way of at least one retainer.

45. The invention as defined in claim 38 wherein in said adhering step said at least one battery cell is secured to the stronger of said first housing portion and second housing portion by way of at least hook and loop tape.

46. A battery pack comprising:

a first housing portion;

a second housing portion coupled to said first housing portion;

at least one battery cell; and an affixiant for adhering said at least one battery cell only to the stronger of said first housing portion and second housing portion, said at least one battery cell being independent of, and not coupled to said second housing portion, whereby relative motion between said at least one battery cell and the stronger of said first housing portion and second housing portion in the direction of the weaker of said First housing portion and second housing portion is substantially prevented.

47. The invention as defined in claim 46 wherein said affixiant comprises glue.

48. The invention as defined in claim 46 wherein said affixiant comprises double-sided sticky tape.

49. The invention as defined in claim 46 wherein said affixiant comprises single-sided sticky tape.

50. The invention as defined in claim 46 wherein said affixiant comprises at least one retainer.

51. The invention as defined in claim 46 wherein said affixiant comprises at least one screw.

52. The invention as defined in claim 46 wherein said affixiant comprises at least one clip which causes a not mechanically resilient coupling between said at least one battery cell and the stronger of said first housing portion and said second housing portion.

53. The invention as defined in claim 46 wherein said affixiant comprises hook and loop tape.

54. A battery pack comprising at least one battery cell contained within a housing made up of at least a first housing portion and a second housing portion, said battery pack being characterized in that said at least one battery cell is adhered only to the stronger of said first housing portion and said second housing portion using at least one from the group consisting of: glue, double-sided sticky tape, hook and loop tape, a screw, a retainer, single-sided sticky tape, a receptacle having a surface formed to match a non-planar surface of said at least one battery cell that is secured to the stronger of said first housing portion and said second housing portion, a clip molded as part of the stronger of said first housing portion and said second housing portion, a clip screwed to the stronger of said first housing portion and said second housing portion, a clip glued to the stronger of said first housing portion and said second housing portion, a clip that covers substantially less than that portion of said stronger housing portion that is covered by said weaker housing portion that is snapped into the stronger of said first housing portion and said second housing portion, and a clip snapped into the stronger of said first housing portion and said second housing portion below the center of mass of said at least one battery cell when the bottom is defined as the direction of said stronger of said first housing portion and second housing portion and the top is defined as the direction of said weaker of said first housing portion and second housing portion, said at least one battery cell being independent of, and not coupled to, said second housing portion, whereby relative motion between said at least one battery cell and the stronger of said first housing portion and second housing portion in the direction of the weaker of said first housing portion and second housing portion is prevented.

55. A battery pack comprising at least one battery cell contained within a housing made up of at least a first housing portion and a second housing portion, said battery pack being characterized in that said at least one battery cell is secured only to the stronger of said first housing portion and said second housing portion so as to cause a not mechanically resilient coupling between said at least one battery cell and the stronger of said first housing portion and said second housing portion, said at least one battery cell being independent of, and not coupled to, said second housing portion, whereby relative motion between said at least one battery cell and the stronger of said first housing portion and second housing portion in the direction of the weaker of said first housing portion and second housing portion is prevented.

56. A battery pack comprising at least one battery cell contained within a housing made up of at least a first housing portion and a second housing portion, said battery pack being characterized in that said at least one battery cell is adhered only to the stronger of said first housing portion and said second housing portion using a method of mechanical coupling that at least partially derives its adhering strength by being coupled to said stronger of said first housing portion and second housing portion below a center of mass for said at least one battery cell, wherein the stronger of said first housing portion and second housing portion is defined as the bottom and said weaker of said first housing portion and second housing portion is defined as the top, said at least one battery cell being independent of, and not coupled to, said second housing, portion, whereby relative motion between said at least one battery cell and the stronger of said first housing portion and second housing portion in the direction of the weaker of said first housing portion and second housing portion is prevented.

57. A battery pack comprising at least one battery cell contained within a housing made up of at least a first housing portion and a second housing portion, said battery pack being characterized in that said at least one battery cell is adhered only to the stronger of said first housing portion and said second housing portion using a method of mechanical coupler that affords substantially no play to said at least one battery cell with respect to the stronger of said first housing portion and second housing portion, said at least one battery cell being independent of, and not coupled to, said second housing portion, whereby relative motion between said at least one battery cell and the stronger of said first housing portion and second housing portion in the direction of the weaker of said first housing portion and second housing portion is prevented.

58. A battery pack comprising at least one battery cell contained within a housing made up of at least a first housing portion and a second housing portion, said battery pack being characterized in that said at least one battery cell is adhered only to the stronger of said first housing portion and said second housing portion by a mechanical coupler that substantially rigidly couples said at least one battery cell to the stronger of said first housing portion and second housing portion, said at least one battery cell being independent of, and not coupled to, said second housing portion, whereby relative motion between said at least one battery cell and the stronger of said first housing portion and second housing portion in the direction of the weaker of said first housing portion and second housing portion is prevented.

* * * * *